United States Patent
Shigeeda (10) Patent No.: US 9,565,133 B2
(45) Date of Patent: Feb. 7, 2017

(54) NETWORK SYSTEM IMPLEMENTING A PLURALITY OF SWITCHING DEVICES TO BLOCK PASSAGE OF A BROADCAST SIGNAL

(75) Inventor: Tetsuya Shigeeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 141 days.

(21) Appl. No.: 14/237,567

(22) PCT Filed: Aug. 24, 2011

(86) PCT No.: PCT/JP2011/069087
§ 371 (c)(1),
(2), (4) Date: Feb. 7, 2014

(87) PCT Pub. No.: WO2013/027286
PCT Pub. Date: Feb. 28, 2013

(65) Prior Publication Data
US 2014/0185619 A1    Jul. 3, 2014

(51) Int. Cl.
*H04L 12/933* (2013.01)
*H04L 12/28* (2006.01)
(Continued)

(52) U.S. Cl.
CPC ......... *H04L 49/15* (2013.01); *H04L 12/1886* (2013.01); *H04L 12/28* (2013.01); *H04L 12/462* (2013.01);
(Continued)

(58) Field of Classification Search
None
See application file for complete search history.

(56) References Cited

U.S. PATENT DOCUMENTS

2002/0027495 A1* 3/2002 Darby, Jr. ............... B61L 3/125
340/298
2002/0091926 A1* 7/2002 Fukutomi .................... 713/170
(Continued)

FOREIGN PATENT DOCUMENTS

CN      1929449 A    3/2007
CN    101155109 A    4/2008
(Continued)

OTHER PUBLICATIONS

The extended European Search Report issued on Apr. 8, 2015, by the European Patent Office in corresponding European Patent Application No. 11871164.7-1853. (8 pages).
(Continued)

*Primary Examiner* — Jenee Williams
(74) *Attorney, Agent, or Firm* — Buchanan Ingersoll & Rooney PC (57) ABSTRACT

To provide a network system including a network constructed by combining a plurality of switching devices. The network includes a first partial network including switching devices and a second partial network that is formed outside the first partial network and includes switching devices. The switching device in the first partial network connected to the second partial network blocks passage of a broadcast signal that is transmitted from a terminal device and that has a specific logical port number as transmission information at a physical port.

6 Claims, 2 Drawing Sheets

(51) Int. Cl.
*H04L 12/741* (2013.01)
*H04L 12/46* (2006.01)
*H04L 12/931* (2013.01)
*H04L 12/18* (2006.01)
*H04L 12/40* (2006.01)

(52) U.S. Cl.
CPC ........... *H04L 12/4625* (2013.01); *H04L 45/74* (2013.01); *H04L 49/201* (2013.01); *H04L 2012/40293* (2013.01)

(56) References Cited

U.S. PATENT DOCUMENTS

| | | | |
|---|---|---|---|
| 2003/0043779 A1* | 3/2003 | Remboski | H04L 12/42 370/351 |
| 2003/0043781 A1 | 3/2003 | Proctor et al. | |
| 2003/0152035 A1* | 8/2003 | Pettit et al. | 370/252 |
| 2003/0152067 A1* | 8/2003 | Richmond et al. | 370/352 |
| 2003/0154380 A1* | 8/2003 | Richmond et al. | 713/182 |
| 2004/0114612 A1* | 6/2004 | Even et al. | 370/401 |
| 2004/0208189 A1* | 10/2004 | Fukuda | 370/401 |
| 2005/0204062 A1* | 9/2005 | Sekine et al. | 709/245 |
| 2006/0013141 A1 | 1/2006 | Mutoh et al. | |
| 2006/0180709 A1* | 8/2006 | Breton | B61L 15/0036 246/1 C |
| 2006/0256717 A1* | 11/2006 | Caci | 370/229 |
| 2007/0127376 A1 | 6/2007 | Chao et al. | |
| 2007/0140237 A1 | 6/2007 | Gustin et al. | |
| 2008/0062874 A1* | 3/2008 | Shimadoi | 370/232 |
| 2008/0198749 A1 | 8/2008 | Nguyen et al. | |
| 2008/0279203 A1* | 11/2008 | Ramalho Ribeiro dos Santos et al. | 370/406 |
| 2009/0219900 A1* | 9/2009 | Kokkinen | B61L 15/0027 370/338 |
| 2010/0039986 A1* | 2/2010 | Jones | 370/328 |
| 2010/0091663 A1 | 4/2010 | Takeyama et al. | |
| 2010/0284038 A1* | 11/2010 | Hosogoshi | 709/233 |
| 2010/0325718 A1* | 12/2010 | Walker et al. | 726/12 |
| 2011/0199928 A1* | 8/2011 | Jiang | H04L 63/20 370/252 |
| 2012/0026878 A1* | 2/2012 | Scaglione | H04L 41/0816 370/235 |
| 2012/0120964 A1* | 5/2012 | Koponen et al. | 370/409 |
| 2013/0003607 A1* | 1/2013 | Kini | H04L 45/66 370/256 |
| 2013/0058354 A1* | 3/2013 | Casado | H04L 12/4633 370/401 |
| 2013/0110328 A1* | 5/2013 | Falk | B61L 15/0036 701/19 |

FOREIGN PATENT DOCUMENTS

| | | |
|---|---|---|
| JP | 2006-033275 A | 2/2006 |
| JP | 2006-287704 A | 10/2006 |

OTHER PUBLICATIONS

International Search Report (PCT/ISA/210) mailed on Oct. 18, 2011, by the Japanese Patent Office as the International Searching Authority for International Application No. PCT/JP2011/069087.
Written Opinion (PCT/ISA/237) mailed on Oct. 18, 2011, by the Japanese Patent Office as the International Searching Authority for International Application No. PCT/JP2011/069087.
Douglas E. Comer, Internetworking with TCP/IP, Principles, Protocols, and Architecture, vol. 1, 5$^{th}$ Edition, Aug. 2002, pp. 296-337 (contents same as 4$^{th}$ Edition cited in specification).
Extended European Search Report corresponding to European Patent Application No. 11871164.7 dated Jan. 15, 2016; 9 pages.
P. Ferguson Cisco Systems, Inc, et al., entitled "Network Ingress Filtering: Defeating Denial of Service Attacks Which Employ IP Source Address Spoofing", The Internet Society, (2000); 11 pages.
European Office Action dated Aug. 3, 2016 issued in corresponding European Patent Appln. No. 11871164.7 (7 pages).
Chinese Official Action mailed in corresponding Chinese Patent Application No. 2011800729656 dated Mar. 1, 2016 with partial English translation of the substantive portion (8 pages).
Chinese Office Action dated Aug. 29, 2016 issued in corresponding Chinese Patent Appln. No. 201180072965.6, with English translation (8 pages).

* cited by examiner

NETWORK SYSTEM IMPLEMENTING A PLURALITY OF SWITCHING DEVICES TO BLOCK PASSAGE OF A BROADCAST SIGNAL

FIELD

The present invention relates to a network system, and more particularly to a network system constructed in a train.

BACKGROUND

TCP/IP is a well known communication protocol used between devices (see, for example, Non Patent Literature 1). In the TCP/IP, an IP address allocated to each device is used to specify a destination and a source in order to perform communication. It should be noted that there is, for example, a limited broadcast address as a unique IP address. When transmission data is transmitted specifying its destination as a limited broadcast address, the transmission data reaches all the devices in a network.

Generally, a method of transmitting transmission data to all the devices in a network is referred to as a "broadcast". The range over which the broadcast can reach is referred to as a "broadcast domain".

CITATION LIST

Non Patent Literature

Non Patent Literature 1: Internetworking with TCP/IP Vol. 1, 4th edition, by Douglas E. Comer (Kyoritsu Shuppan)

SUMMARY

Technical Problem

When a broadcast is used, all the devices in the network receive broadcast data, so that it is difficult to form a subgroup including a plurality of devices in a broadcast domain and broadcast data to the subgroup. For example, in a network in a train formed with a plurality of vehicles, it becomes difficult to divide respective devices in the network into groups corresponding to respective cars in which each device is incorporated and to realize both a broadcast to each group and a broadcast to all the devices in the network.

The present invention has been achieved to solve the above problems, and an object of the present invention is to provide a network system that can limit the range of access of a broadcast having a specific condition.

Solution to Problem

In order to solve the aforementioned problems, a network system including a network constructed by combining a plurality of switching devices according to one aspect of the is configured in such a manner as to include a first subnetwork and a second subnetwork that is formed outside the first subnetwork, and at least one of a switching device in the first subnetwork connected to the second subnetwork and a switching device in the second subnetwork connected to the first subnetwork blocks passage of a broadcast signal that includes a specific logical port number as transmission information.

Advantageous Effects of Invention

According to the present invention, it is possible to limit the range of access of a broadcast to within a first subnetwork or a second subnetwork.

DESCRIPTION OF EMBODIMENTS

Exemplary embodiments of a network system according to the present invention will be explained below in detail and with reference to the accompanying drawings. The present invention is not limited to the embodiments.

First Embodiment

Figure 1:
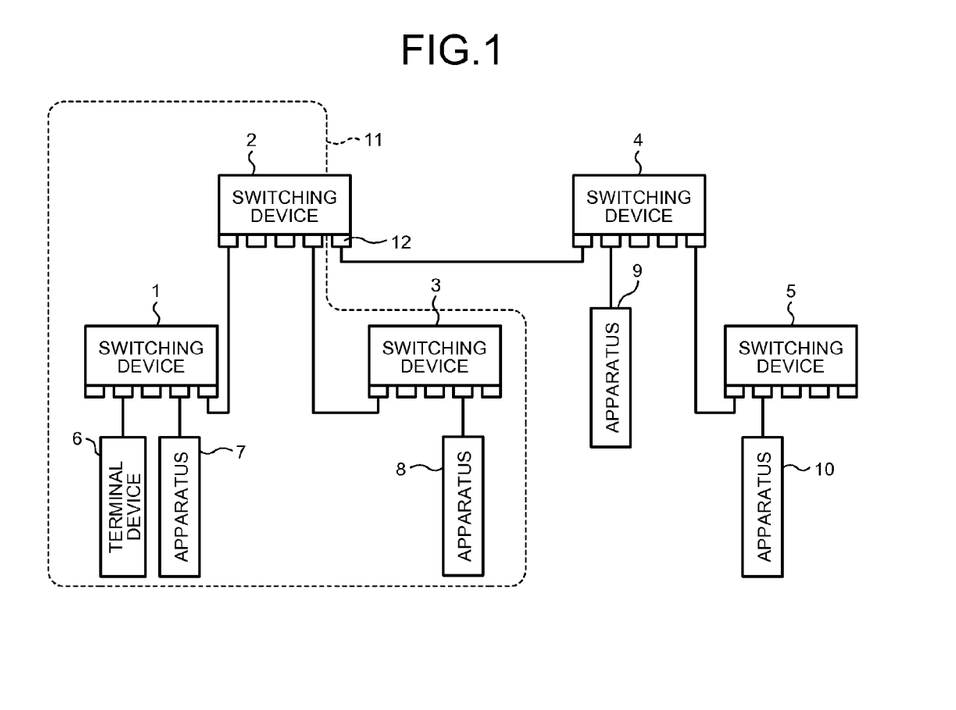
FIG. 1 is an example of a configuration of a network system according to a first embodiment.

FIG. 1 is an example of a configuration of a network system according to a first embodiment. The network system according to the present embodiment includes, for example, switching devices 1 to 5 that are Ethernet® switches, a terminal device 6, and apparatuses 7 to 10.

The switching device 1 is connected to the switching device 2. The switching device 2 is connected to the switching devices 3 and 4. The switching device 4 is connected to the switching device 5. A network is constructed by combining the switching devices 1 to 3 in this manner. The network includes a subnetwork formed of the switching devices 1 to 3 in an area 11 and a subnetwork formed of the switching devices 4 and 5. The terminal device 6 is connected to the switching device 1, the apparatus 7 is connected to the switching device 1, the apparatus 8 is connected to the switching device 3, the apparatus 9 is connected to the switching device 4, and the apparatus 10 is connected to the switching device 5. The switching devices 1 to 5 each include, for example, five physical ports, and connections between the switching devices are established via these physical ports.

An IP address is attached to the terminal device 6, and the terminal device 6 can perform IP communication. Similarly, an IP address is attached to each of the apparatuses 7 to 10, and each of the apparatuses 7 to 10 can perform IP communication. As explained below, in the present embodiment, the terminal device 6 is distinguished from the apparatuses 7 to 10 as an apparatus that can perform broadcasting. However, the apparatuses 7 to 10 can also have a configuration that can perform broadcasting.

Figure 2:
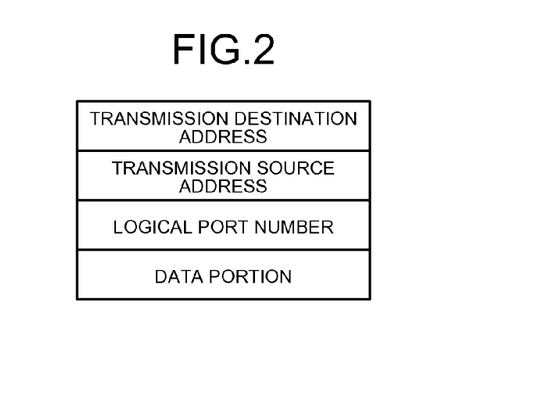
FIG. 2 is a schematic diagram of an example of a configuration of an IP signal to be used for IP communication by a terminal device or apparatuses.

FIG. 2 is a schematic diagram of an example of a configuration of an IP signal to be used for IP communication by the terminal device 6 or the apparatuses 7 to 10. The IP signal includes, for example, a transmission destination address, a transmission source address, a logical port number, and a data portion.

At the time of performing IP communication, when any one of the IP addresses of the terminal device 6 and the apparatuses 7 to 10 is specified as "transmission destination address", the IP signal is transferred to the terminal device 6 or the apparatuses 7 to 10 having the corresponding IP address.

Broadcasting is explained next. When a broadcast is performed from the terminal device 6, a broadcast address is specified as "transmission destination address", and transmission data is transferred to all the apparatuses 7 to 10 in the network. In the present embodiment, a broadcast in which the range of access of the broadcast is limited to, for example, the subnetwork in the area 11 in FIG. 1 is examined in addition to a broadcast in which all the apparatuses 7 to 10 are designated as a "destination". The area 11 includes the switching devices 1 to 3, the terminal device 6, and the apparatuses 7 and 8.

In the present embodiment, the following function is given to the switching device 2 to limit the range of access of the broadcast. That is, at a physical port 12 used for connecting to the switching device 4 outside the area 11 among the physical ports of the switching device 2, the switching device 2 blocks passage of a broadcast signal having a specific logical port number (for example, a logical port number "4000"). In this case, the broadcast signal is an IP signal in which the broadcast address is specified as the transmission destination address. In contrast, the switching device 2 does not block passage of the broadcast signal having a logical port number other than the specific logical port number (for example, a logical port number "4001"), and it allows the broadcast signal to pass therethrough.

The operation is explained next. First, a case where the terminal device 6 specifies a broadcast address as a transmission destination address and the logical port number 4000 to transmit an IP signal to the network is considered. In this case, the IP signal is received by the switching device 1, and the switching device 1 transmits the IP signal to the apparatus 7 via the physical port to which the apparatus 7 is connected, and it also transmits the IP signal to the switching device 2 via the physical port to which the switching device 2 is connected. After having received the IP signal via the physical port to which the switching device 1 is connected, the switching device 2 transmits the IP signal to the switching device 3 via the physical port to which the switching device 3 is connected, and determines whether the logical port number of the IP signal is 4000. That is, when the received IP signal is the broadcast signal, the switching device 2 determines whether the logical port number of the broadcast signal is 4000. When it recognizes that the IP signal is the broadcast signal having the logical port number 4000, the switching device 2 blocks the passage of the IP signal to outside the area 11 at the physical port 12. The switching device 3 transmits the IP signal to the apparatus 8 via the physical port to which the apparatus 8 is connected. As a result, while the IP signal reaches the apparatuses 7 and 8 in the area, the IP signal does not reach the apparatuses 9 and 10 outside the area 11.

In this manner, according to the present embodiment, by transmitting the broadcast signal having the logical port number 4000 from the terminal device 6 despite the transmission destination address being the broadcast address, the transmission range of the broadcast can be easily limited to the subnetwork within the area 11.

A case where the terminal device 6 assumes the transmission destination address as a broadcast address and transmits an IP signal having, for example, the logical port number 4001 to the network is considered next. In this case, because passage of the broadcast signal is not blocked at any of the physical ports of the switching devices 1 to 5, the IP signal is transmitted to all the apparatuses 7 to 10 in the network. That is, because the logical port number of the broadcast signal is different from 4000, passage of the broadcast signal is not blocked even at the physical port 12 of the switching device 2. As a result, all the apparatuses 7 to 10 receive the IP signal.

As explained above, in the present embodiment, in the subnetwork in the area 11 formed of the switching devices 1 to 3 and including the switching device 1 to which the terminal device 6 is connected, when having received a broadcast signal including the logical port number 4000, which is a specific logical port number, as transmission information from the terminal device 6, the switching device 2 that is directly connected to the switching device 4 in the subnetwork formed of the switching devices 4 and 5 outside the area 11 blocks passage of the broadcast signal at the physical port 12 to which the switching device 4 is connected.

Accordingly, in the present network system, by changing the logical port number of the broadcast signal, the broadcast domain can be designated as the entire network (when the logical port number 4001 is specified), or can be limited to the subnetwork in the area 11 (when the logical port number 4000 is specified).

Because the range of access of the broadcast can be limited by specifying, for example, a logical port number other than the transmission destination address to a specific value, while maintaining the broadcast address as the transmission destination address, the present embodiment is particularly useful when it is desired to limit the range of access of the broadcast after the network system is constructed. In this case, because the broadcast domain can be limited without changing any part of the IP address, the range of access of the broadcast can be set more flexibly and easily after the network system is constructed as compared with a case of using multicast or the like.

Furthermore, even when an apparatus is newly connected or disconnected in the network, there is an advantage in that there is no need to perform any system change with regard to limiting the broadcast domain.

Further, according to the present embodiment, the range of access of the broadcast can be limited without causing any increase in traffic.

Limiting the range of access of the broadcast is useful when, depending on the contents of the data portion of the transmission data, it is desired to transmit transmission data only to some part of the apparatuses without transmitting the transmission data to all the apparatuses in the network. For example, the present network system is suitable for a network system constructed in a train, and a specific example of such is explained in the following embodiment.

In the present embodiment, a broadcast signal having a specific logical port number and transmitted from the terminal device 6 is blocked at the physical port 12 of the switching device 2. However, the broadcast signal can be blocked at a physical port among the physical ports of the switching device 4 to which the switching device 2 is connected. In this case, although the broadcast signal having a specific logical port number is transmitted from the switching device 2 to the switching device 4 via the physical port 12, the switching device 4 blocks the broadcast signal from entering the subnetwork formed of the switching devices 4 and 5. By blocking the broadcast signal in this manner, the broadcast domain can be limited within the area 11 as in the present embodiment.

Furthermore, in the present embodiment, it has been explained that the logical port number to be blocked at the physical port 12 is 4000 as an example. However, values other than 4000 can be used. In addition, it is also possible to specify a plurality of logical port numbers and to block the broadcast signal having these logical port numbers.

Further, it has been assumed that the area 11 includes the switching devices 1 to 3, for example. However, it is possible to use an arbitrary area including at least one switching device and one apparatus. That is, it can be an area that includes a part of all the apparatuses in a part of the entire network.

Second Embodiment

Figure 3:
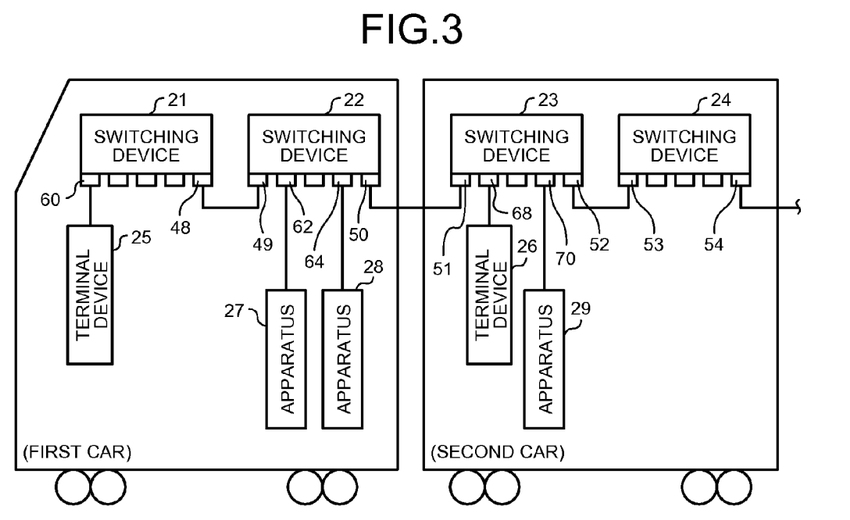
FIG. 3 is an example of a configuration of a network system according to a second embodiment.

FIG. 3 is an example of a configuration of a network system according to a second embodiment, and it is specifically a configuration diagram of a network system constructed in a train in which a plurality of vehicles are connected. In FIG. 3, as an example, the train has a formation of three or more cars and the configurations of a first car and a second car are shown as examples. However, vehicles other than these cars can be configured in the same manner. The train can have a two-car formation having the configuration exemplified in FIG. 3.

In FIG. 3, the network system according to the present embodiment includes switching devices 21 to 24, terminal devices 25 and 26, and apparatuses 27 to 29. The switching devices 21 and 22, the terminal device 25, and the apparatuses 27 and 28 are incorporated in the first car, and the switching devices 23 and 24, the terminal device 26, and the apparatus 29 are incorporated in the second car. The first car is the lead vehicle or the last vehicle, and the second car is a vehicle in the middle. Similarly to the first embodiment, the switching devices 21 to 24 are the Ethernet® switches, for example. In the present embodiment, one terminal device is incorporated in each of the cars. The terminal devices 25 and 26 are, for example, train-information management devices. The train-information management device is a device that collects and manages train information and that can monitor the operating state of apparatuses incorporated in a train and can control operations of those apparatuses individually.

The switching device 21 is connected to the switching device 22, the switching device 22 is connected to the switching device 23, and the switching device 23 is connected to the switching device 24. That is, the switching devices 21 to 24 are connected in this order, for example, in a daisy chain configuration.

In the first car, the terminal device 25 is connected to the switching device 21, and the apparatuses 27 and 28 are connected to the switching device 22. In the first car, a subnetwork constituted by the switching devices 21 and 22 is formed. In the second car, the terminal device 26 is connected to the switching device 23, and the apparatus 29 is connected to the switching device 23. In the second car, a subnetwork constituted by the switching devices 23 and 24 is formed. The subnetwork in the first car and the subnetwork in the second car are connected to each other by the switching devices 22 and 23. Although not shown, the same subnetwork is formed in the third car.

The present embodiment is configured to realize both broadcasting to the entire train and broadcasting limited to the inside of the respective cars. Specifically, the network is constructed so that a broadcast signal having a specific logical port number (for example, the logical port number 4000) is blocked at the respective physical ports used for mutual connection of the switching device 22 in the first car and the switching device 23 in the second car. That is, in FIG. 3, passage of the broadcast signal having the logical port number 4000 is blocked at a physical port 50 among the physical ports of the switching device 22, which is used for connection to the switching device 23. Furthermore, passage of the broadcast signal having the logical port number 4000 is blocked at a physical port 51 among the physical ports of the switching device 23, which is used for connection to the switching device 22. Further, passage of the broadcast signal having the logical port number 4000 is blocked at a physical port 54 of the physical ports of the switching device 24, which is used for connection to a switching device (not shown) in the third car.

The operation of the present embodiment is explained next. The terminal device 25 specifies a broadcast address as the transmission destination address of an IP signal, and the logical port number as 4000, and sets information of the first car (information indicating the first car) in a data portion to transmit the IP signal regularly to a network. The configuration of the transmission data is identical to the one shown in FIG. 2. In this case, the IP signal is received by the switching device 21 via a physical port 60, and the switching device 21 transmits the IP signal to the switching device 22 via a physical port 48 to which the switching device 22 is connected. Upon reception of the IP signal via a physical port 49 to which the switching device 21 is connected, the switching device 22 transmits the IP signal to the apparatuses 27 and 28 via physical ports 62 and 64 to which the apparatuses 27 and 28 are connected, and it determines whether the logical port number of the IP signal is 4000. That is, when the received IP signal is a broadcast signal, the switching device 22 determines whether the logical port number is 4000. When recognizing that the logical port number of the IP signal is 4000, the switching device 22 blocks passage of the IP signal into the subnetwork in the second car at the physical port 50 to which the switching device 23 is connected.

In this manner, while the IP signal is transferred to the switching devices 21 and 22 and the apparatuses 27 and 28 connected to the switching device 22, the IP signal is not transferred to the switching device 23. As a result, the IP signal is not transferred to the second car, and is not transferred to the third and subsequent cars either. Accordingly, the range of access of the broadcast is limited to the first car, regarding the broadcast signal having the logical port number 4000 transmitted from the terminal device 25.

The terminal device 26 specifies a broadcast address as the transmission destination address of an IP signal, and the logical port number as 4000, and sets information on the second car (information indicating the second car) in a data portion to transmit the IP signal regularly to a network. In this case, the IP signal is received by the switching device 23 via a physical port 68, and the switching device 23 transmits the IP signal to the switching device 24 via a physical port 52 to which the switching device 24 is connected, transmits the IP signal to the apparatus 29 via a physical port 70 to which the apparatus 29 is connected, and determines whether the logical port number of the IP signal is 4000. That is, when the received IP signal is a broadcast signal, the switching device 23 determines whether the logical port number is 4000. When recognizing that the logical port number of the IP signal is 4000, the switching device 23 blocks passage of the IP signal into the subnetwork in the first car at the physical port 51 to which the switching device 22 is connected.

The switching device 24 receives the IP signal from the switching device 23 via a physical port 53, and because the IP signal is the broadcast signal, determines whether the logical port number is 4000. When recognizing that the logical port number of the IP signal is 4000, the switching device 24 blocks passage of the IP signal at the physical port 54 connected to a switching device (not shown) in the third car.

In this manner, while the IP signal is transferred to the switching devices 23 and 24 and the apparatus 29 connected to the switching device 23, the IP signal is not transferred to the switching device 22 in the first car and a switching device (not shown) in the third car. As a result, the IP signal is transferred neither to the first car, nor to the third and subsequent cars. In this manner, the range of access of the broadcast of the broadcast signal having the logical port number 4000 transmitted from the terminal device 26 is limited to the inside of the second car. According to the same configuration, the range of access of the broadcast can also be limited to the inside of each of the third and subsequent cars. That is, in the switching devices mutually connected between the adjacent cars, it will be sufficient if the passage of the broadcast signal having a specific logical port number is blocked.

As described above, the apparatuses 27 and 28 incorporated in the first car receive only the broadcast signal transmitted by the terminal device 25 among the broadcast signals having the logical port number 4000. Because the apparatuses 27 and 28 can acquire the information on the first car by reading the content of the data portion of the broadcast signal respectively, they can determine that they themselves are installed in the first car.

The apparatus 29 incorporated in the second car receives only the broadcast signal transmitted by the terminal device 26 among the broadcast signals having the logical port number 4000. Because the apparatus 29 can acquire the information on the second car by reading the contents of the data portion of the broadcast signal, it can determine that itself is installed in the second car. The same applies to the third and subsequent cars.

When the terminal device 25 specifies a broadcast address as the transmission destination address, and the logical port number as 4001 which is different from 4000 to transmit the IP signal to the network, as in the first embodiment, because passage of the broadcast signal is not blocked at any of the physical ports of the switching devices 21 to 24, the IP signal is transmitted to all the apparatuses 27 to 29, the terminal device 26 and the like in the network. As a result, the apparatuses 27 to 29, the terminal device 26, and the like receive the IP signal.

When the terminal device 26 specifies a broadcast address as the transmission destination address, and the logical port number as 4001 which is different from 4000 to transmit the IP signal to the network, because passage of the broadcast signal is not blocked at any of the physical ports of the switching devices 21 to 24, the IP signal is transmitted to all the apparatuses 27 to 29, the terminal device 25 and the like in the network. As a result, the apparatuses 27 to 29, the terminal device 25, and the like receive the IP signal.

As explained above, in the present embodiment, in the subnetwork in the first car, when receiving the broadcast signal including the logical port number 4000, which is the specific logical port number, from the terminal device 25, the switching device 22 connected to the subnetwork in the second car blocks passage of the broadcast signal into the subnetwork in the second car. Also in the network in the second car, when receiving the broadcast signal including the logical port number 4000 from the terminal device 26, the switching device 23 connected to the subnetwork in the first car blocks passage of the broadcast signal into the subnetwork in the first car. Further, when receiving the broadcast signal including the logical port number 4000 from the terminal device 26, the switching device 24 connected to the subnetwork in the third car blocks passage of the broadcast signal into the subnetwork in the third car at the physical port 54 connected to the subnetwork in the third car.

Accordingly, in the present network system, by switching the logical port number of the broadcast signal, the broadcast domain can be specified as the entire network in the train (when the logical port number 4001 is specified), or the broadcast domain can be limited to the subnetwork in the respective cars (when the logical port number 4000 is specified).

According to the present embodiment, the broadcast domain can be divided into respective vehicles.

According to the present embodiment, the apparatuses installed in each of the cars can, after receiving a broadcast signal having the logical port number 4000 transmitted from the terminal device, determine in which car they themselves are installed by referring to the data portion of the broadcast signal.

Further, in the present embodiment, at the physical ports 50 and 51 used for connection between the switching devices 22 and 23 that connect the vehicles, a broadcast signal having a specific logical port number is blocked, and the range of access of the broadcast signal is limited to each car. However, when there is a division of functions in the vehicle, the range of access of the broadcast can be further limited within that vehicle. For example, in FIG. 3, when the whole network configuration of the first and second cars is incorporated into one vehicle, divided regions of two broadcast domains are formed in one vehicle.

When a plurality of continuous vehicles are integrated as a managing target, a limited region of the broadcast domain can be set with respect to these vehicles. For example, in FIG. 3, when blocking of the broadcast signal having the specific logical port number is performed by the switching device 24 and a switching device (not shown) in the third car instead of being performed by the switching devices 22 and 23, a broadcast limited to the inside of the first and second cars can be realized.

In the present embodiment, when the broadcast signal including the specific logical port number as transmission information transmitted from the terminal device 25 is received, the switching device 22 blocks passage of the broadcast signal into the subnetwork in the second car at the physical port 50. When the broadcast signal including the specific logical port number as the transmission information transmitted from the terminal device 26 is received, the switching device 23 blocks the passage of the broadcast signal into the subnetwork in the first car at the physical port 51, and blocks the passage of the broadcast signal into the subnetwork in the third car is further blocked at the physical port 54 of the switching device 24. However, the broadcast signal including the specific logical port number transmitted from the terminal device 26 can be blocked from entering the subnetwork in the first car at the physical port 50 of the switching device 22, the broadcast signal including the specific logical port number transmitted from the terminal device 25 can be blocked from entering into the subnetwork in the second car at the physical port 51 of the switching device 23, and the broadcast signal including the specific logical port number transmitted from a terminal device (not shown) in the third car can be blocked from entering the subnetwork in the second car at the physical port 54 of the switching device 24.

That is, when the broadcast signal including the specific logical port number as transmission information transmitted from the terminal device 26 is received, the switching device 22 can block passage of the broadcast signal into the subnetwork in the first car at the physical port 50. When the broadcast signal including the specific logical port number as the transmission information transmitted from the terminal device 25 is received, the switching device 23 can block passage of the broadcast signal into the subnetwork in the second car at the physical port 51. When the broadcast signal including the specific logical port number as the transmission information transmitted from a terminal device (not shown) in the third car is received, the switching device 23 can block passage of the broadcast signal into the subnetwork in the second car at the physical port 54 of the switching device 24. Even in this case, the range of access of the broadcast can be limited to each car, and thus effects identical to those of the present embodiment can be achieved.

Furthermore, in the present embodiment, a case where both the switching device 22 in the first car and the switching device 23 in the second car block the broadcast signal having a specific logical port number has been explained. However, a configuration in which the broadcast signal is blocked by any one of the switching devices 22 and 23 can be also applied. For example, when the broadcast signal including the specific logical port number as the transmission information transmitted from the terminal device 25 is received, the switching device 22 can block passage of a broadcast signal into the subnetwork in the second car at the physical port 50, and when a broadcast signal including the specific logical port number as the transmission information transmitted from the terminal device 26 is received, the switching device 22 can block passage of a broadcast signal into the subnetwork in the first car at the physical port 50. With this configuration, even without giving a blocking function to the switching device 23, a broadcast from the terminal device 25 does not reach the second car and a broadcast from the terminal device 26 does not reach the first car. The same applies to the switching device 24 and a switching device (not shown) in the third car. Accordingly, also in this case, effects identical to those of the present embodiment can be achieved.

Further, when the terminal device incorporated in each vehicle is set to be a train-information management device, the train-information management device in each vehicle can transmit the train information of the vehicle by a broadcast only to the apparatus in its own vehicle, by using a broadcast signal having a specific logical port number.

Configurations, operations, and effects of the present embodiment other than those described above are as explained in the first embodiment.

Third Embodiment

Figure 4:
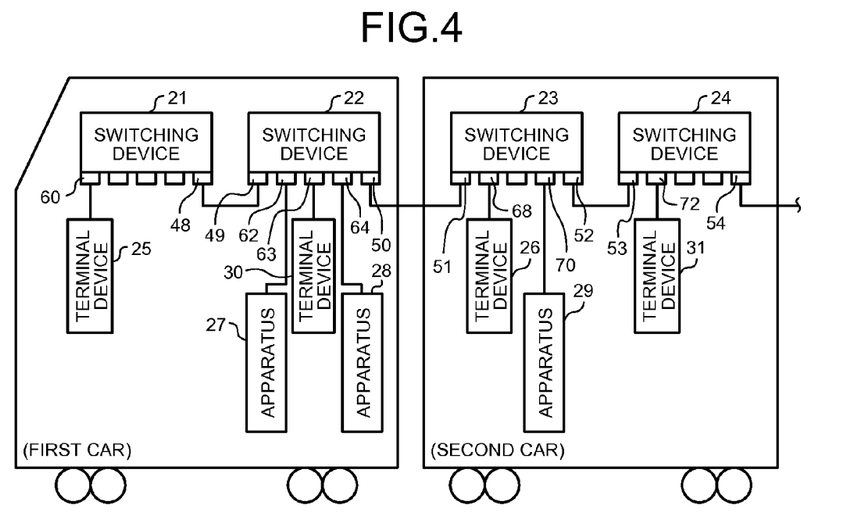
FIG. 4 is an example of a configuration of a network system according to a third embodiment.

FIG. 4 is an example of a configuration of a network system according to the third embodiment, and it is specifically a configuration diagram of a network system constructed in a train in which a plurality of vehicles are connected. In FIG. 4, the same reference sign refers to the same constituent elements shown in FIG. 3, and thus only constituent elements different from those shown in FIG. 3 are explained.

In FIG. 4, a terminal device 30 is connected to the switching device 22 via a physical port 63, and a terminal device 31 is connected to the switching device 24 via a physical port 72. The terminal device 30 is incorporated in the first car and the terminal device 31 is incorporated in the second car. In the present embodiment, two terminal devices are incorporated in each vehicle. The terminal devices 25, 26, 30, and 31 are, for example, train-information management devices.

Similarly to the second embodiment, the present embodiment is configured such that both broadcast over the entire train and broadcasts limited to each car are realized. That is, at the physical port 50 used for connection to the switching device 23 among the physical ports of the switching device 22, passage of a broadcast signal having the logical port number 4000 is blocked. At the physical port 51 used for connection to the switching device 22 among the physical ports of the switching device 23, passage of a broadcast signal having the logical port number 4000 is blocked. At the physical port 54 used for connection to a switching device (not shown) in the third car among the physical ports of the switching device 24, passage of a broadcast signal having the logical port number 4000 is blocked.

The operation of the present embodiment is explained next. The terminal device 25 specifies a broadcast address as the transmission destination address of an IP signal, and the logical port number as 4000, and sets information on the first car (information indicating the first car) in a data portion to transmit the IP signal regularly to a network. The configuration of the transmission data is identical to that shown in FIG. 2. In this case, the IP signal is received by the switching device 21, and the switching device 21 transmits the IP signal to the switching device 22 via the physical port 48 to which the switching device 22 is connected. Upon reception of the IP signal via the physical port 49 to which the switching device 21 is connected, the switching device 22 transmits the IP signal to the apparatuses 27 and 28 via the physical ports 62 and 64 to which the apparatuses 27 and 28 are connected, transmits the IP signal to the terminal device 30 via the physical port 63 to which the terminal device 30 is connected, and determines whether the logical port number of the IP signal is 4000. That is, when the received IP signal is a broadcast signal, the switching device 22 determines whether the logical port number is 4000. When recognizing that the logical port number of the IP signal is 4000, the switching device 22 blocks passage of the IP signal into the subnetwork in the second car at the physical port 50 to which the switching device 23 is connected.

The terminal device 30 specifies a broadcast address as the transmission destination address of an IP signal, and the logical port number as 4000, and sets information of the first car (information indicating the first car) in a data portion to transmit the IP signal regularly to the network. In this case, the IP signal is received by the switching device 22, and the switching device 22 transmits the IP signal to the switching device 21 via the physical port 49 to which the switching device 21 is connected, transmits the IP signal to the apparatuses 27 and 28 via the physical ports 62 and 64, and transmits the IP signal to the terminal device 30 via the physical port 63. The switching device 22 then determines whether the logical port number of the IP signal is 4000. That is, when the received IP signal is a broadcast signal, the switching device 22 determines whether the logical port number is 4000. When recognizing that the logical port number of the IP signal is 4000, the switching device 22 blocks passage of the IP signal into the subnetwork in the second car at the physical port 50 to which the switching device 23 is connected. Further, the switching device 21 transmits the IP signal to the terminal device 25 via the physical port 60.

The terminal device 26 specifies a broadcast address as the transmission destination address of an IP signal, and the logical port number as 4000, and sets information on the second car (information indicating the second car) in a data portion to transmit the IP signal regularly to a network. In this case, the IP signal is received by the switching device 23 via the physical port 68, and the switching device 23 transmits the IP signal to the switching device 24 via the physical port 52 to which the switching device 24 is connected, transmits the IP signal to the apparatus 29 via the physical port 70 to which the apparatus 29 is connected, and determines whether the logical port number of the IP signal is 4000. That is, when the received IP signal is a broadcast signal, the switching device 23 determines whether the logical port number is 4000. When recognizing that the logical port number of the IP signal is 4000, the switching device 23 blocks passage of the IP signal into the subnetwork in the first car at the physical port 51 to which the switching device 22 is connected.

The switching device 24 receives the IP signal from the switching device 23 via the physical port 53, and transmits the IP signal to the terminal device 31 via the physical port 72. Because the IP signal is a broadcast signal, the switching device 24 determines whether the logical port number of the IP signal is 4000. When recognizing that the logical port number of the IP signal is 4000, the switching device 24 blocks passage of the IP signal into the subnetwork in the third car at the physical port 54 to which a switching device (not shown) in the third car is connected.

The terminal device 31 specifies a broadcast address as the transmission destination address of an IP signal, and the logical port number as 4000, and sets information on the second car (information indicating the second car) in a data portion to transmit the IP signal regularly to a network. In this case, the IP signal is received by the switching device 24 via the physical port 72, and the switching device 24 transmits the IP signal to the switching device 23 via the physical port 53 to which the switching device 23 is connected. Because the IP signal is a broadcast signal, the switching device 24 determines whether the logical port number of the IP signal is 4000. When recognizing that the logical port number of the IP signal is 4000, the switching device 24 blocks passage of the IP signal into the subnetwork in the third car at the physical port 54 to which a switching device (not shown) in the third car is connected.

When the IP signal is received by the switching device 23 via the physical port 52 to which the switching device 24 is connected, the switching device 23 transmits the IP signal to the apparatus 29 via the physical port 70 to which the apparatus 29 is connected, transmits the IP signal to the terminal device 26 via the physical port 68 to which the terminal device 26 is connected, and determines whether the logical port number of the IP signal is 4000. That is, when the received IP signal is a broadcast signal, the switching device 23 determines whether the logical port number is 4000. When recognizing that the logical port number of the IP signal is 4000, the switching device 23 blocks passage of the IP signal into the subnetwork in the first car at the physical port 51 to which the switching device 22 is connected.

In this manner, the apparatuses 27 and 28 incorporated in the first car receive only broadcast signals transmitted from the terminal devices 25 and 30 among the broadcast signals having the logical port number 4000. Further, because the apparatuses 27 and 28 can acquire information on the first car respectively by reading the contents of the data portion of the broadcast signal, the apparatuses 27 and 28 can determine that they themselves are installed in the first car.

Furthermore, when the terminal devices 25 and 30 form a redundant system (in this case, a dual system), even if any one of the terminal devices 25 and 30 has a defect, as long as the defect is only in one system, the apparatuses 27 and 28 can receive broadcast signals from the terminal device 25 or 30 to determine the number of the car in which the apparatuses 27 and 28 are incorporated. Further, even if a malfunction occurs in a transmission path from the terminal device 25, as long as a transmission path from the terminal device 30 is normal, the apparatuses 27 and 28 can receive the broadcast signal from the terminal device 30 to determine the number of the car in which the apparatuses 27 and 28 are incorporated. Furthermore, even if a malfunction occurs in the transmission path from the terminal device 30, as long as the transmission path from the terminal device 25 is normal, the apparatuses 27 and 28 can receive the broadcast signal from the terminal device 25 to determine the number of the car in which the apparatuses 27 and 28 are incorporated.

Similarly, the apparatus 29 incorporated in the second car receives only broadcast signals transmitted from the terminal devices 26 and 31 among the broadcast signals having the logical port number 4000. Further, because the apparatus 29 can acquire information on the second car by reading the contents of the data portion of the broadcast signal, the apparatus 29 can determine that the apparatus itself is installed in the second car.

Furthermore, when the terminal devices 26 and 31 form a redundant system (in this case, a dual system), even if any of the terminal devices 26 and 31 has a defect, as long as the defect is only in one system, the apparatus 29 can receive the broadcast signal from the terminal device 26 or 31 to determine the number of the car in which the apparatus 29 is incorporated. Further, even if a malfunction occurs in a transmission path from the terminal device 26, as long as a transmission path from the terminal device 31 is normal, the apparatus 29 can receive the broadcast signal from the terminal device 31 to determine the number of the car in which the apparatus 29 is incorporated. Furthermore, even if a malfunction occurs in the transmission path from the terminal device 31, as long as the transmission path from the terminal device 26 is normal, the apparatus 29 can receive broadcast signals from the terminal device 26 to determine the number of the car in which the apparatus 29 is incorporated.

Configurations, operations, and effects of the present embodiment other than those described above are identical to those explained in the second embodiment. Particularly, various blocking methods explained in the second embodiment can be similarly applicable to the present embodiment.

INDUSTRIAL APPLICABILITY

The present invention is useful as a system capable of limiting or dividing a broadcast domain of, for example, an Ethernet® network.

REFERENCE SIGNS LIST 1 to 5, 21 to 24 switching device
6, 25, 26, 30, 31 terminal device
7 to 10, 27 to 29 apparatus
11 area
12, 48 to 54, 60, 62 to 64, 68, 70, 72 physical port

The invention claimed is:
1. A network system including a network constructed by combining a plurality of switching devices, the network system comprising:

a first subnetwork and a second subnetwork that is formed outside the first subnetwork, wherein the network is constructed in a train formed with a plurality of vehicles and the subnetworks formed in each of the vehicles include a switching device, a terminal device, and an apparatus connected to a corresponding switching device; and at least one of a switching device in the first subnetwork connected to the second subnetwork and a switching device in the second subnetwork connected to the first subnetwork blocks passage of a broadcast signal that includes a specific logical port number as transmission information, wherein the first subnetwork is a subnetwork provided in a first vehicle, which is an arbitrary vehicle of the plurality of vehicles, and wherein the second subnetwork is a subnetwork provided in a second vehicle coupled to the vehicle in which the first subnetwork is provided.

2. The network system according to claim 1, wherein the second vehicle is coupled to a third vehicle, a third subnetwork, which is a subnetwork including the switching device, the terminal device, and the apparatus connected to corresponding switching device, is formed in the third vehicle, and when having received a broadcast signal including the specific logical port number as transmission information transmitted from the terminal device in the second network, the switching device in the second subnetwork connected to the third subnetwork blocks passage of the broadcast signal into the third subnetwork at a physical port to which the third subnetwork is connected.

3. The network system according to claim 2, wherein the broadcast signal includes a broadcast address as a transmission destination address, a transmission source address, a logical port number, and a data portion, and the data portion includes information of a vehicle in which the terminal device is incorporated.

4. The network system according to claim 3, wherein the terminal device is a train-information management device.

5. The network system according to claim 4, wherein two of the terminal devices are incorporated in each of the vehicles to form a dual system.

6. A network system including a network constructed by combining a plurality of switching devices, the network system comprising:

a first subnetwork and a second subnetwork that is formed outside the first subnetwork, at least one of a switching device in the first subnetwork connected to the second subnetwork and a switching device in the second subnetwork connected to the first subnetwork blocks passage of a broadcast signal to the second subnetwork, or the first subnetwork, when the broadcast signal includes a specific logical port number as transmission information, and a terminal device that is connected to the network and can transmit the broadcast signal, wherein the first subnetwork is constituted by including the terminal device, when having received a broadcast signal including the specific logical port number as transmission information transmitted from the terminal device in the first subnetwork, the switching device in the first subnetwork connected to the second subnetwork blocks passage of the broadcast signal into the second subnetwork at a physical port to which the second subnetwork is connected, the second subnetwork is constituted including the terminal device, and when having received a broadcast signal including the specific logical port number as transmission information transmitted from the terminal device in the second network, the switching device in the first subnetwork connected to the second subnetwork blocks passage of the broadcast signal into the first subnetwork at a physical port to which the second subnetwork is connected.

* * * * *